United States Patent
Hsu et al.

(10) Patent No.: US 6,954,408 B2
(45) Date of Patent: Oct. 11, 2005

(54) SIGNAL CALIBRATION AND SIGNAL GENERATION METHOD

(75) Inventors: Chih-Kung Hsu, Taipei (TW); Tsai-Hsin Tsai, Taipei (TW)

(73) Assignee: VIA Technologies, Inc., Taipei Hsien (TW)

(*) Notice: Subject to any disclaimer, the term of this patent is extended or adjusted under 35 U.S.C. 154(b) by 239 days.

(21) Appl. No.: 10/249,309

(22) Filed: Mar. 31, 2003

(65) Prior Publication Data

US 2003/0185113 A1 Oct. 2, 2003

(30) Foreign Application Priority Data

Apr. 1, 2002 (TW) .......................................... 91106472 A (51) Int. Cl.$^7$ ................................................ G11B 7/00
(52) U.S. Cl. ............................... 369/44.28; 369/30.13; 369/124.15
(58) Field of Search ............................ 369/44.26, 44.29, 369/30.13, 30.14, 59.17, 53.28, 124.15

(56) References Cited

U.S. PATENT DOCUMENTS

| | | | | |
|---|---|---|---|---|
| 5,251,194 A | * | 10/1993 | Yoshimoto et al. | 369/44.26 |
| 5,831,951 A | * | 11/1998 | Kamioka et al. | 369/47.26 |
| 5,982,722 A | * | 11/1999 | Hashimoto | 369/44.29 |
| 6,366,549 B1 | * | 4/2002 | Lee et al. | 369/112.05 |
| 6,526,006 B1 | * | 2/2003 | Yoshimi et al. | 369/44.28 |
| 6,728,184 B2 | * | 4/2004 | Chan | 369/53.28 |
| 6,735,162 B2 | * | 5/2004 | Armitage et al. | 369/124.11 |

* cited by examiner

Primary Examiner—W. R. Young
Assistant Examiner—Kyung D. Kim
(74) Attorney, Agent, or Firm—Jiang Chyun office (57) ABSTRACT

A radio frequency ripple zero crossing signal calibration method for an optical disk reader undergoing a track following to track seeking transition is disclosed. The method utilizes sampling to obtain radio frequency ripple peak level during a track seeking operation and radio frequency ripple DC level during a track following operation and using their differences as a calibrated value. Through the calibrated value, the radio frequency ripple zero crossing slice level is modified so that a correct radio frequency ripple zero crossing signal is obtained during a track following to track seeking transition. In a track following to seeking transition, this arrangement prevents distortion of the radio frequency ripple signal and corresponding drift in the radio frequency zero crossing signal that may lead to errors in computing moving speed and counting tracks of the pickup head. Hence, search capacity of the optical disk reader is improved and the pickup head is better controlled.

19 Claims, 7 Drawing Sheets

SIGNAL CALIBRATION AND SIGNAL GENERATION METHOD

CROSS REFERENCE TO RELATED APPLICATIONS

This application claims the priority benefit of Taiwan application serial no. 91106472, filed Apr. 01, 2002.

BACKGROUND OF INVENTION

1. Field of Invention

The present invention relates to a radio frequency ripple zero crossing (RFZC) signal calibration method for an optical disk system. More particularly, the present invention relates to a radio frequency ripple zero crossing (RFZC) signal calibration method when an operating optical disk system switches from a track following operation to a track seeking operation.

2. Description of Related Art

In a modern computer system, optical disks are important storage media for holding a huge volume of data. To look for data within an optical disk, a pickup head needs to be properly positioned over a correct track. Moving speed and track crossing number of the pickup head is often controlled by reference signals including track error zero crossing (TEZC) signal and radio frequency ripple zero crossing (RFZC) signal. Hence, any error in the reference signals may lead to inaccurate movement of the pickup head and ultimately optical track-searching capacity.

Figure 1:
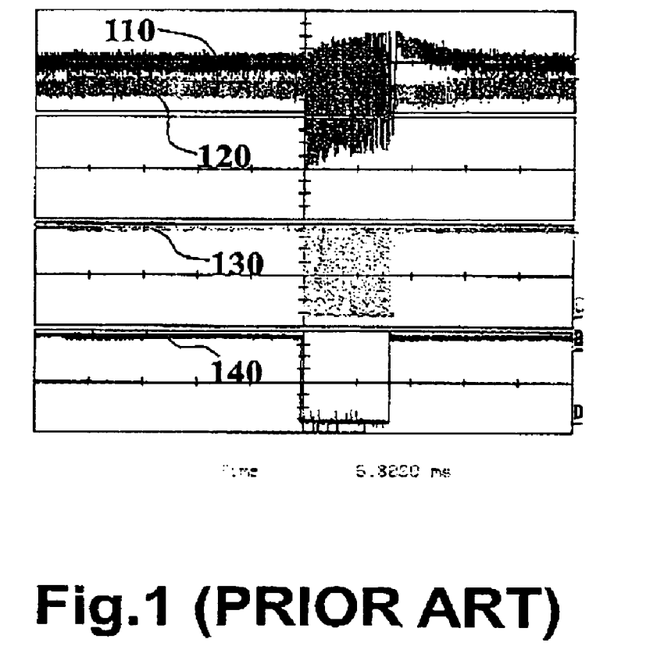
FIG. 1 is a diagram showing the RFZC signal waveform for a track following to track seeking transition.
Figure 2:
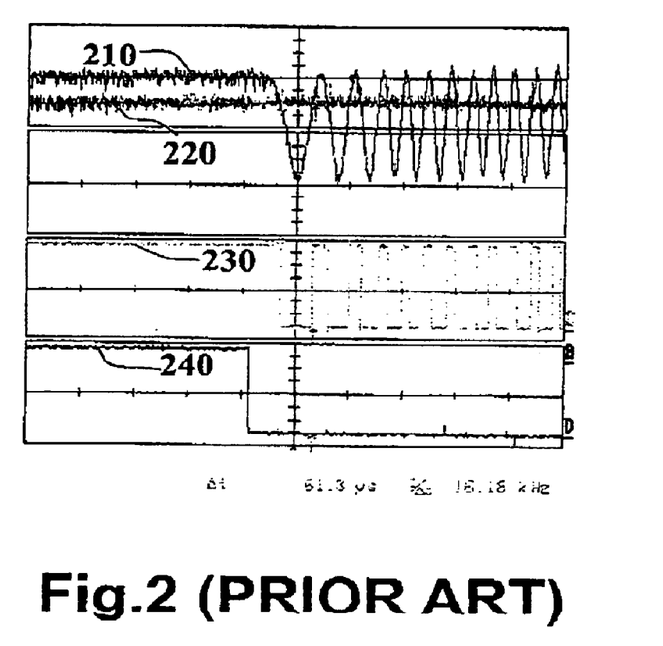
FIG. 2 is an expanded version of the waveform diagram in FIG. 1 showing the RFZC signal at a low-level cycle.
Figure 3:
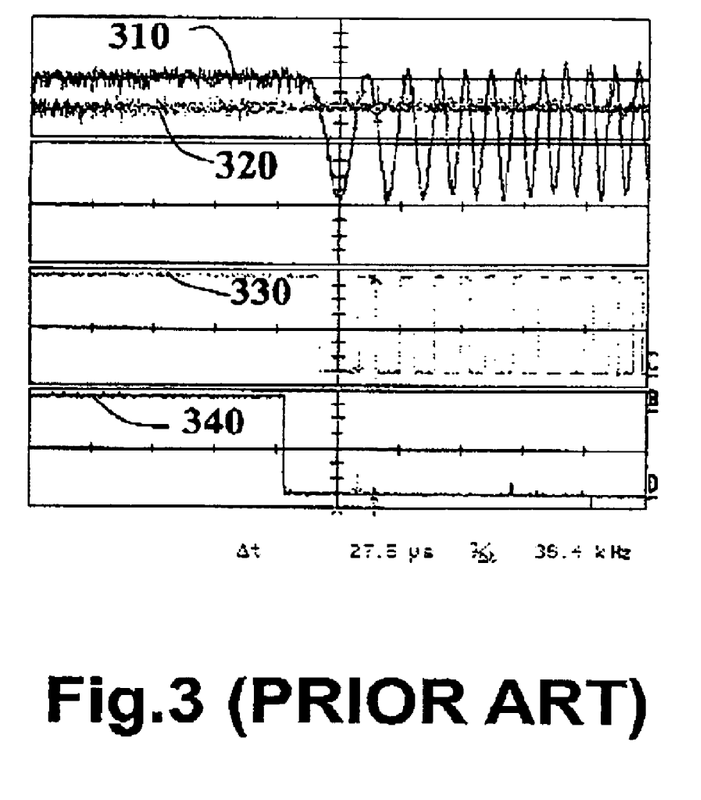
FIG. 3 is an expanded version of the waveform diagram in FIG. 1 showing the RFZC signal at a high-level cycle.

In the past, radio frequency ripple zero crossing (RFZC) signal was produced by comparing the radio frequency ripple (RFRP) signal and the fixed radio frequency zero crossing (RFZC) slice level. That is, when RFRP is greater than the slice level, the RFZC value is 1. Conversely, if RFRP is smaller than the slice level, the RFZC value is 0. In a stable track-crossing condition, since the RFRP signal is relatively stable, the RFZC signal is also stable. However, there is minor distortion of the RFRP signal in the early stage of a transition from a track following operation to a track seeking operation. Therefore, duty cycle of the RFZC signal may deviate from the norm and the search capacity may deteriorate.F FIG. 1 is a diagram showing the RFZC signal waveform for a track following to track seeking transition. FIGS. 2 and 3 are expanded versions regarding the early stage of the waveform diagram in FIG. 1 when the optical disk system switches from the following mode to the seeking mode. In FIGS. 1 to 3, numerals 110, 210 and 310 point to the RFRP signal waveforms. Numerals 120, 220 and 320 point to the RFZC slice levels. Numerals 130, 230 and 330 point to the resulting RFZC signals of comparisons between associated RFRP signals and the RFZC slice levels. Numerals 140, 240 and 340 indicate the status of the search flags that the search flags are pulled to low voltage levels within search control periods. In the early stage of the transition from the track following to track seeking operation, DC levels of the RFRP signals drift down slightly as shown in FIGS. 2 and 3. Hence, the low-level condition is maintained for 61.8 $\mu$s ($\Delta$t in FIG. 2) while the high-level status is maintained for 27.5 $\mu$s ($\Delta$t in FIG. 3) during the first cycle of the RFZC signal. In general, a cycle of such unbalanced magnitude (27.5/81.8) has considerable effect on the performance of an optical disk system.

SUMMARY OF INVENTION

Accordingly, one object of the present invention is to provide a track following to track seeking radio frequency zero crossing (RFZC) signal calibration method for an optical disk reader that uses a modified RFZC slice level to prevent a RFZC signal drift during the initial stage of the track following to track seeking transition. Hence, searching capacity of the optical disk reader is improved and control of pickup head is maintained.

To achieve these and other advantages and in accordance with the purpose of the invention, as embodied and broadly described herein, the invention provides a track following to track seeking radio frequency zero crossing (RFZC) signal calibration method. The method includes the following steps. First, a radio frequency ripple signal is received. DC level and peak value of the radio frequency ripple signal during a track seeking operation is obtained. DC level of a radio frequency ripple signal during a track following operation and a radio frequency ripple signal during a track seeking operation are also obtained. When a track following to track seeking operation occurs, the radio frequency ripple zero crossing slice level is equal to the DC level of the radio frequency ripple signal during seeking mode minus the difference between the peak value of the radio frequency ripple signal during the seeking mode and the DC value of the radio frequency ripple signal during track following mode.

In the embodiment of this invention, the DC level of the radio frequency ripple signal during seeking mode is obtained after a set period since the start of a track seeking operation by sampling a set number of times the output from a low-pass filter after receiving the radio frequency ripple signal and computing an average value. DC level of the radio frequency ripple signal during following mode is obtained after a set period since the start of a track following operation by sampling a set number of times the output from a low-pass filter after receiving the radio frequency ripple signal and computing an average value. Peak value of the radio frequency ripple signal is obtained after a set period since the start of a track seeking operation by sampling a set number of times the output from a low-pass filter after receiving the peak value signal of the radio frequency ripple signal and computing an average value.

This invention uses the value of a modified radio frequency ripple zero crossing slice level to produce a correct radio frequency ripple zero crossing signal during a track following to track seeking transition. Hence, a drift in the radio frequency ripple zero crossing signal and corresponding computational errors in moving speed and track counting for the pickup head due to a distortion of the radio frequency ripple signal during a track following to seeking transition is prevented. Ultimately, searching capacity of the optical disk reader is improved and control of pickup head is maintained.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 4:
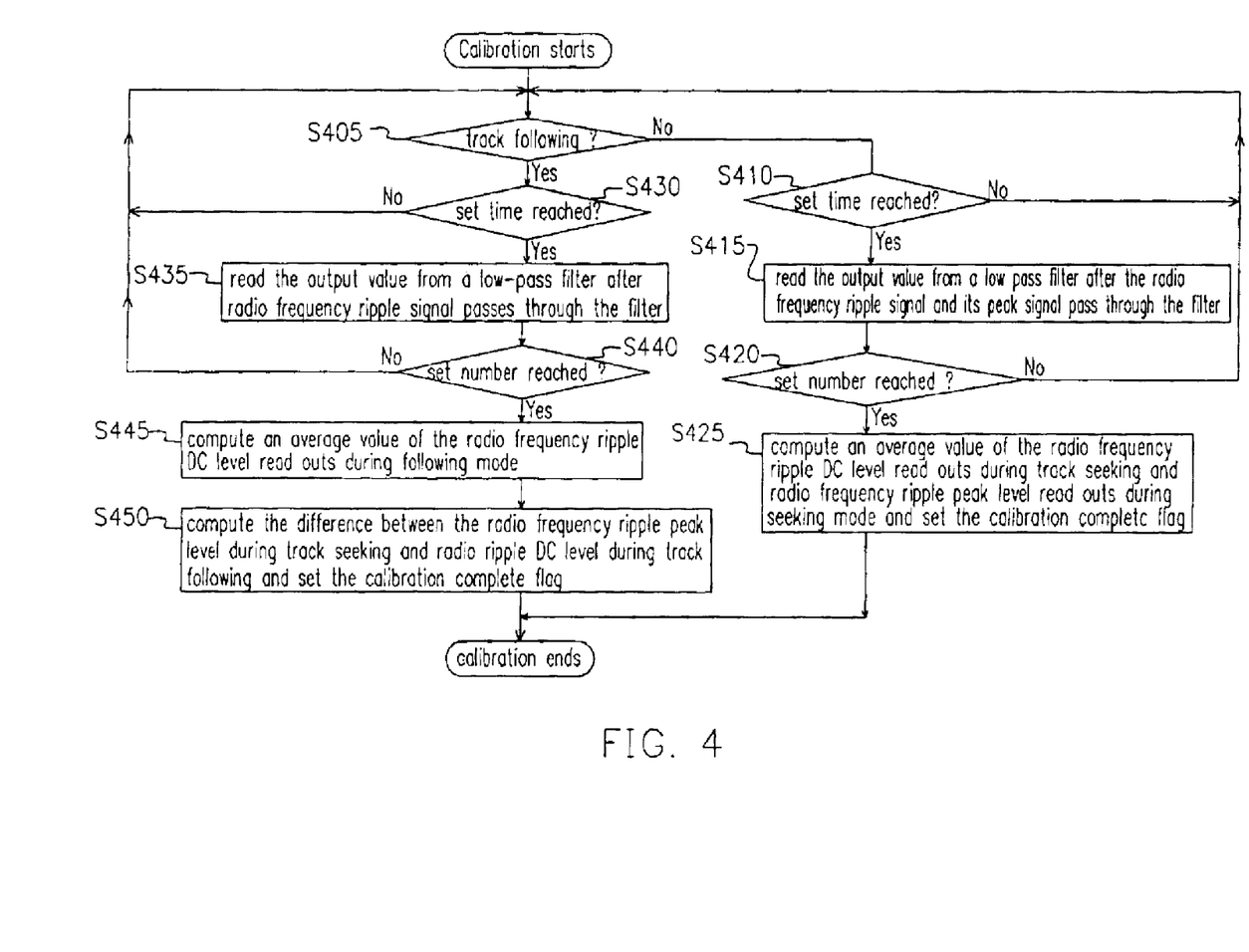
FIG. 4 is a flow chart showing first half of a RFZC calibration for an optical disk reader transiting from a track following operation to a track seeking operation according to a preferred embodiment of this invention.
Figure 5:
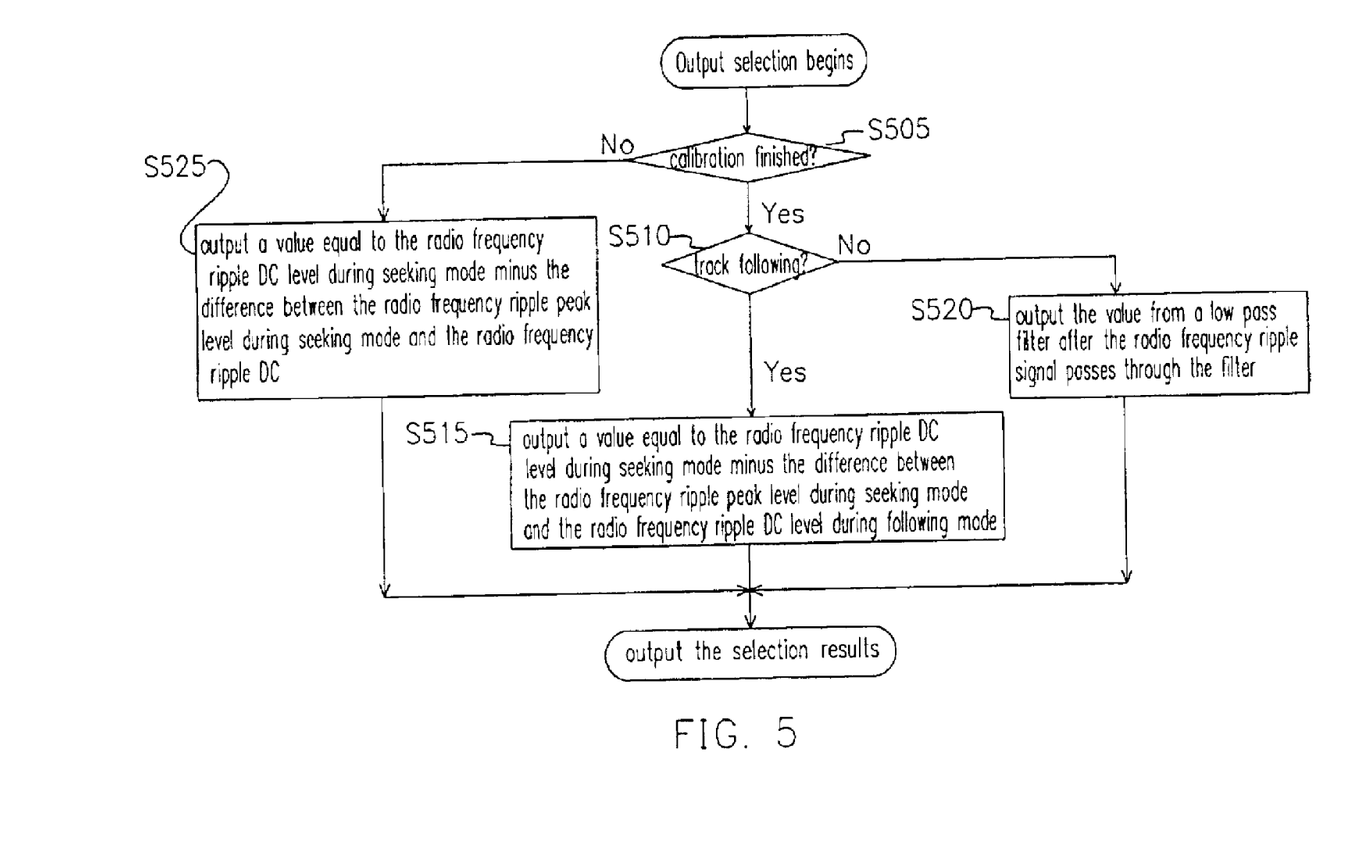
FIG. 5 is a flow chart showing second half of a RFZC calibration for an optical disk reader transiting from a track following operation to a track seeking operation according to a preferred embodiment of this invention.
Figure 6:
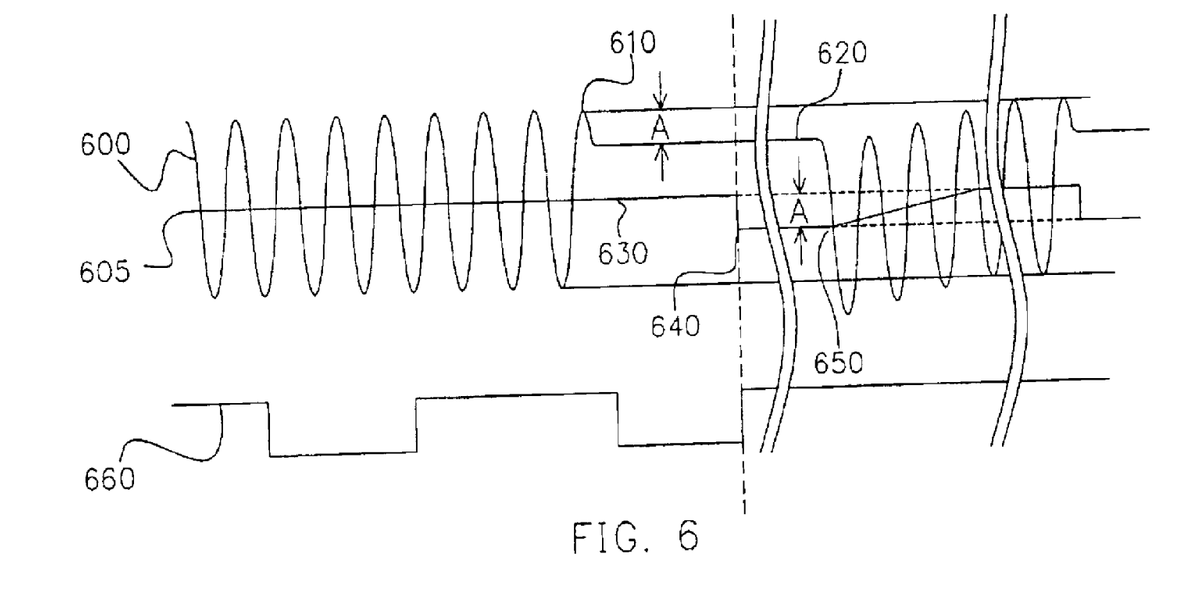
FIG. 6 is a diagram showing the RFRP and RFZC slice level when an optical disk reader transits from a track following operation to a track seeking operation according to one preferred embodiment of this invention.

FIGS. 4 and 5 are flow charts showing first half and second half of a RFZC calibration for an optical disk reader transiting from a track following operation to a track seeking operation according to a preferred embodiment of this invention. FIG. 6 is a diagram showing the RFRP and RFZC slice level when an optical disk reader switches from following mode to a seeking mode. The trace labeled 600 is a radio frequency ripple (RFRP) signal while the trace labeled 605 shows the variation of RFZC slice level. To prevent any distortion of the RFRP signal affecting the RFZC signal during a transition from a track following to a track seeking operation, the RFZC slice level must be modified at appropriate point. In this invention, a radio frequency ripple DC level 630 during a stable track seeking operation, a radio frequency ripple DC level 620 during a stable track following operation and a radio frequency ripple peak level 610 during a stale track seeking operation are obtained. A calibration complete flag is used to indicate relative calibration periods in the embodiment, wherein a trace label 660 shows the status of the calibration complete flag (two calibration periods are shown in FIG. 6 and more detailed descriptions regarding theses two calibration periods are given later). In addition, the calibrated value A is defined as the radio frequency ripple peak level 610 minus the radio frequency ripple DC level (stable track following operation) 620. After the calibration procedure for obtaining the calibrated value A at time 640 in FIG. 6, the optical disk reader is working under a track following operation. Hence, the RFZC slice level is equal to the radio frequency ripple DC level 630 minus the calibrated value A. When the optical disk reader changes from a following to a seeking mode (at a time labeled 650 in FIG. 6), the RFZC slice level is equal to the low-pass filtered output of the RFRP signal (this method can be understood in conventional terms and hence is not repeated here). Therefore, although there is a downward drifting of the RFRP signal as shown in FIG. 6, the RFZC slice level still maintains a definite level of correctness largely unaffected by the drift in the RFRP signal. This modified RFZC slice level and the RFRP signal are compared to generate a RFZC signal. Since the RFZC slice level modifies according to the degree of distortion, a more balanced RFZC signal duty cycle is obtained.

FIG. 4 shows the steps to obtain a calibrated value A. First, the optical disk reader is checked to determine whether the reader is currently operating in the track following mode or the seeking mode (S405). Please note that the calibration complete flag should be cleared (i.e. its status will be pull to high when clearing) and thus actuate a calibration period before actuating the step S405. Additionally, the calibration periods regarding seeking and following modes are shown by using steps S410~425 and S435~450, respectively. If the optical disk reader is in the seeking mode, the calibration period regarding the seeking mode is actuated and whether the settling time is reached or not will be firstly determined (S410). If the settling time is reached, low-pass filtered output value of the RFRP signal and low-pass filtered output value of the RFRP peak value signal are read (S415). Thereafter, determine if the preset number of sampling is reached (S420). If the number of sampling has not reached the preset number yet, sampling is continued. However, if the number of sampling has reached the preset value, the sampled values from the low-pass filter for RFRP signal are averaged to produce the radio frequency ripple DC level value 630. Similarly, the sampled values from the low-pass filter for RFRP peak signal are averaged to produce the radio frequency ripple peak level value 610 (S425). Notably, the calibration complete flag should be set (i.e. its status will be dropped to low when setting) to indicate the ending of the calibration period regarding seeking mode. When the optical disk reader is in the track following operation, the calibration period regarding the following mode is actuated and whether the settling time is reached or not will be firstly determined (S430). If the settling time is reached, low-pass filtered output of the RFRP signal is read (S435). Next, determine if the preset number of sampling is reached (S440). If the number of sampling has not reached the preset number yet, sampling is continued. However, if the number of sampling has reached the preset value, the average of the sampled values obtained from the low-pass filtered RFRP signal is taken to be the radio frequency ripple DC level value 620 (S445). The calibrated value A is defined to be the radio frequency ripple peak level value 610 minus the radio frequency ripple DC level value 620 and the calibration completion flag is also set (i.e. its status will be dropped to low when setting) to indicate the ending of the calibration period regarding following mode (S450). Please note that the calibration period intervals within the seeking and following modes, and the settling time and the sampling number used by the aforementioned procedures may be set case by case according to actually situations.

The selection of RFZC slice level may proceed according to FIG. 5. First, the calibration status indicated by the calibration complete flag is checked (S505). Before the end of the calibration periods, the RFZC slice level is the aforementioned radio frequency ripple DC level 630 (S525). On the other hand, when associated calibration procedures are finished, determine if the optical disk reader is in the track following state or the track seeking state (S510). If the optical disk is operating in the track following state, the RFZC slice level is equal to the radio frequency ripple DC level 630 minus the calibrated value A (S515). Otherwise, the RFZC slice level is the low-pass filtered output of the RFRP signal (S520).

Figure 7:
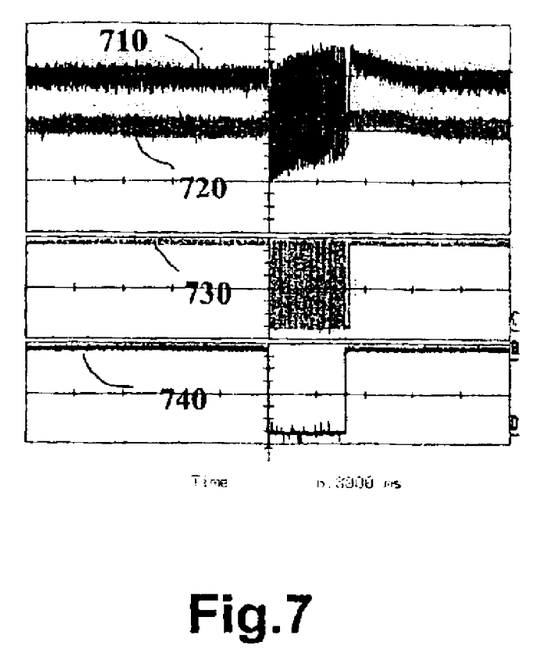
FIG. 7 is a diagram showing the RFZC signal waveform for a transition from a track following operation to a track seeking operation according to one preferred embodiment of this invention.
Figure 8:
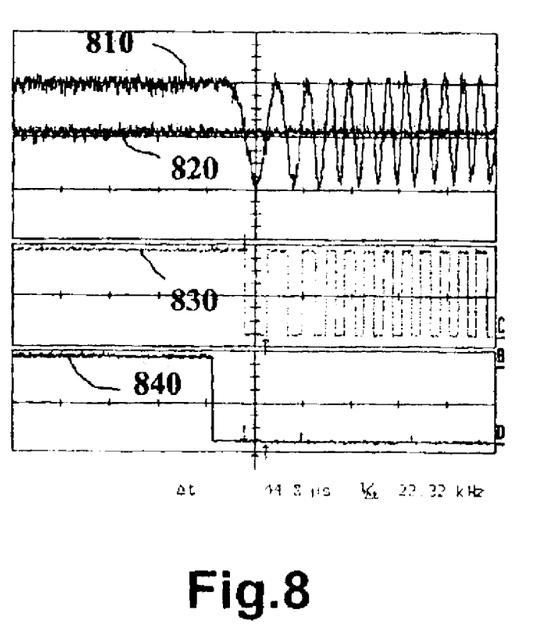
FIG. 8 is an expanded version of the waveform diagram in FIG. 7 showing the RFZC signal at a low-level cycle.
Figure 9:
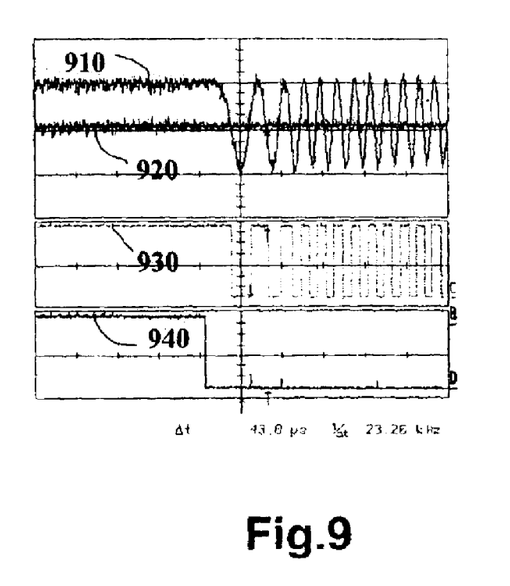
FIG. 9 is an expanded version of the waveform diagram in FIG. 7 showing the RFZC signal at a high-level cycle.

FIG. 7 is a diagram showing the RFZC signal waveform for a transition from a track following operation to a track seeking operation according to one preferred embodiment of this invention. FIGS. 8 and 9 are expanded versions of the waveform diagram in FIG. 7. As shown in FIGS. 7, 8 and 9, the reference labels 710, 810, 910 indicate the waveform of RFRP signal. The reference labels 720, 820, 920 are RFZC slice level. The reference labels 730, 830, 930 are RFZC signal generated by a comparison between the RFRP and RFZC slice level. The reference labels 740, 840, 940 are search flags showing the search control period. As shown in FIGS. 8 and 9, there is a downward drifting of the RFRP signal DC level at the start of a transition from a track following operation to a track seeking operation. Since the RFZC slice level modifies according to the level of drift, the low-level in the first cycle of the generated RFZC signal is maintained for a period of 44.8 $\mu$s ($\Delta$t as shown in FIG. 8) while the high level is maintained for a period of 48 $\mu$s ($\Delta$t as shown in FIG. 9). Hence, a balanced cycle is obtained.

According to the calibration timing of this invention, the RFRP slice level must be calibrated (that is, the RFRP slice level=RFRP DC level calibrated value A) at the beginning of a track following to track seeking transition. During the track seeking operation, the slice level of the RFRP is obtained from the DC level of the RFRP. At the beginning of a transition from the track seeking to the track following operation, the slice level of the RFRP must be re-calibrated (that is, the slice level of the RFRP=the DC level of the RFRP calibrated value A). Hence, distortion of the RFRP signal and associated errors in computing the moving speed and track counting of the pickup head due to a transition from the track following to a track seeking operation is prevented. Ultimately, search capacity of the optical disk reader is improved and control of pickup head is maintained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A signal generation method, comprising the steps of:
    obtaining a first DC level and a first peak level of an input signal during a track seeking operation;
    obtaining a second DC level of the input signal during a track following operation;
    relating the slice level of the input signal to the first DC level, the first peak level and the second DC level at the initial stage of the transition from the track following to the track seeking operation; and
    comparing the input signal with a slice level to generate a zero crossing signal.

2. The signal generation method of claim 1, wherein the input signal is a radio frequency ripple signal.

3. The signal generation method of claim 1, wherein the generation of the slice level includes equating the slice level to the first DC level minus a difference between the first peak level and the second DC level.

4. The signal generation method of claim 1, wherein the first DC level is obtained by sampling a low-pass filter processed input signal after the track seeking operation has been initialized for a preset period.

5. The signal generation method of claim 1, wherein the second DC level is obtained by sampling a low-pass filter processed input signal after the track following operation has been initialized for a preset period.

6. The signal generation method of claim 1, wherein the first peak level of the input signal is obtained by sampling a low-pass filter processed peak signal of the input signal after the track seeking operation has been initialized for a preset period.

7. The signal generation method of claim 1, wherein the method further includes the following steps:
    equating the slice level to the DC level of the input signal during track seeking operation; and
    equating the slice level to the first DC level minus a difference between the first peak level and the second DC level during a transition from the track seeking operation to the track following operation.

8. A signal generation method for an optical disk drive, comprising the steps of:
    obtaining a first DC level and a first peak level of an input signal during a track seeking operation;
    obtaining a second DC level of the input signal during a track following operation;
    obtaining a first difference between a first peak value and the second DC level;
    obtaining a second difference between the first DC level and the first difference, wherein the second difference is treated as a slice level; and
    comparing the input signal with the slice level to generate a zero crossing signal.

9. The signal generation method of claim 8, wherein the input signal is a radio frequency ripple signal.

10. The signal generation method of claim 8, wherein the optical disk drive is a CD-R drive or a CD-RW drive.

11. The signal generation method of claim 8, wherein the first DC level is obtained by sampling a low-pass filter processed input signal after the track seeking operation has been initialized for a preset period.

12. The signal generation method of claim 8, wherein the second DC level is obtained by sampling a low-pass filter processed input signal after the track following operation has been initialized for a preset period.

13. The signal generation method of claim 8, wherein the first peak level of the input signal is obtained by sampling a low-pass filter processed peak signal of the input signal after the track seeking operation has been initialized for a preset period.

14. A slice level calibration method for an optical disk reader, wherein the optical disk reader provides an input signal, the method comprising the steps of:
    obtaining a first DC level and a first peak level of the input signal during a track seeking operation;
    obtaining a second DC level of the input signal during a track following operation; and
    calibrating the slice level by subtracting a difference between the first peak level of the input signal and the second DC level of the input signal from the first DC level of the input signal during a transition from the track following operation to the track seeking operation.

15. The slice level calibration method of claim 14, wherein the input signal is a radio frequency ripple (RFRP) signal.

16. The slice level calibration method of claim 14, wherein the first DC level of the input signal is obtained by sampling a low-pass filter processed DC level of the input signal after the track seeking operation has been initialized for a preset period.

17. The slice level calibration method of claim 14, wherein the second DC level of the input signal is obtained by sampling a low-pass filter processed DC level of the input signal after the track following operation has been initialized for a preset period.

18. The slice level calibration method of claim 14, wherein the first peak level of the input signal is obtained by sampling a low-pass filter processed peak level of the input signal after the track seeking operation has been initialized for a preset period.

19. The signal generation method of claim 14, wherein the optical disk reader is included in a CD-R drive or a CD-RW drive.

* * * * *